United States Patent [19]

Calo et al.

[11] Patent Number: 4,805,134
[45] Date of Patent: Feb. 14, 1989

[54] ELECTRONIC SYSTEM FOR ACCESSING GRAPHICAL AND TEXTUAL INFORMATION

[75] Inventors: Seraphin B. Calo, Peekskill; Krishnamurthi Kannan, Yorktown Heights; Suk S. Soo, Mount Kisco; Thomas G. Burket, Pleasantville; John W. Wiley, Jr., Yorktown Heights, all of N.Y.

[73] Assignee: International Business Machines Corporation, Armonk, N.Y.

[21] Appl. No.: 817,389

[22] Filed: Jan. 9, 1986

[51] Int. Cl.[4] .................................................. G06F 13/00
[52] U.S. Cl. ................................................... 364/900
[58] Field of Search ... 364/200 MS File, 900 MS File; 358/85, 86, 142; 370/89, 86, 90, 60, 58, 54, 85, 103, 104; 340/717, 721, 711, 703, 797; 379/94, 221, 40, 50, 200, 100, 94, 96

[56] References Cited

U.S. PATENT DOCUMENTS

| 4,337,483 | 6/1982 | Guillou | 358/114 |
| 4,337,485 | 6/1982 | Chambers | 358/147 |
| 4,379,947 | 4/1983 | Warner | 179/1 |
| 4,479,196 | 10/1984 | Ferrer et al. | 364/900 |
| 4,533,948 | 8/1985 | McNamara et al. | 358/86 |
| 4,555,781 | 11/1985 | Baldry et al. | 370/60 |
| 4,649,533 | 3/1987 | Chorley et al. | 370/58 |
| 4,691,340 | 9/1987 | Maeda et al. | 379/96 |

OTHER PUBLICATIONS

Kumamoto et al. "Captain System." Japan Telecommunication Review (Jul. 1980), pp. 215–222.
Marti et al. "The Antiope Videotex System." IEEE Transaction on Computer Electronics, vol. CE-25, No. 3 (Jul. 1979), pp. 327–333.
Robinson et al. "Touch-Tone Teletext a Combined Teletext-Viewdata System." IEEE Transactions on Computer Electronics, vol. CE-25, No. 3 (Jul. 1979), pp. 298–303.
J. P. Gray, "Network Services in Systems Network Architecture," IEEE Transactions on Communications, vol. COM-25, No. 1, pp. 104–116, Jan. 1977.

Primary Examiner—David Y. Eng
Assistant Examiner—Robert B. Harrell
Attorney, Agent, or Firm—Thomas P. Dowd; Marc D. Schechter

[57] ABSTRACT

An architecture for the implementation of an information utility for accessing information and executing transactions on an interactive basis between Videotex databases and individual end user terminals, some or all of which may be remotely located with respect to each other. The utility may be associated with a Videotex Application Network (VAN) and includes a combination of distributed, semiautonomous Operations Nodes (ONs), each characterized by (1) one or more affiliated users, (2) the inclusion of some form of database, and (3) one or more customized application programs, and each is also capable of "standalone" operation. Each database comprises pages of control information and displayable data. Each node comprises a directory of databases at other nodes.

50 Claims, 12 Drawing Sheets

Overall Architecture of a Videotex Operations Node.

Example Hardware Configuration for an ON Host

FIG. 4 Relationship of ON-specific software to other example components

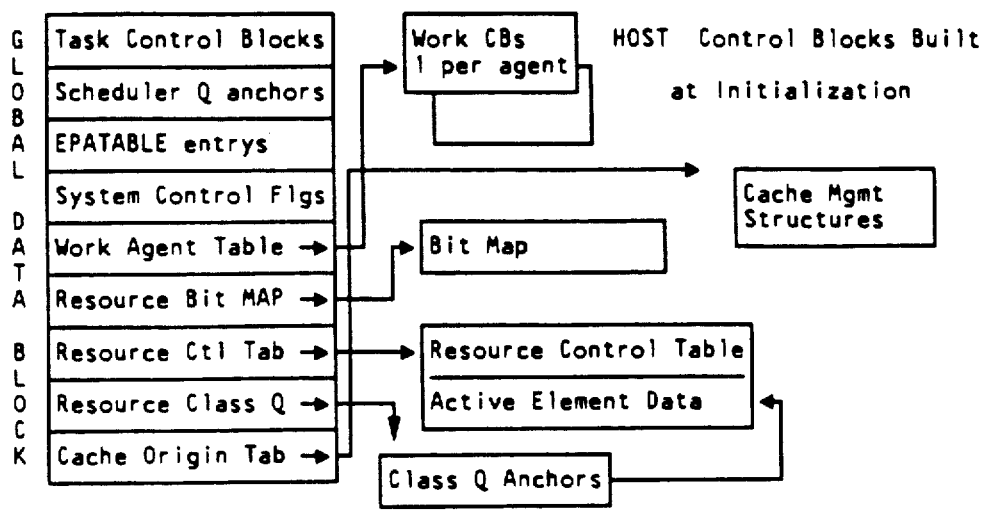
Global Data Block in an ON Host
FIG. 5
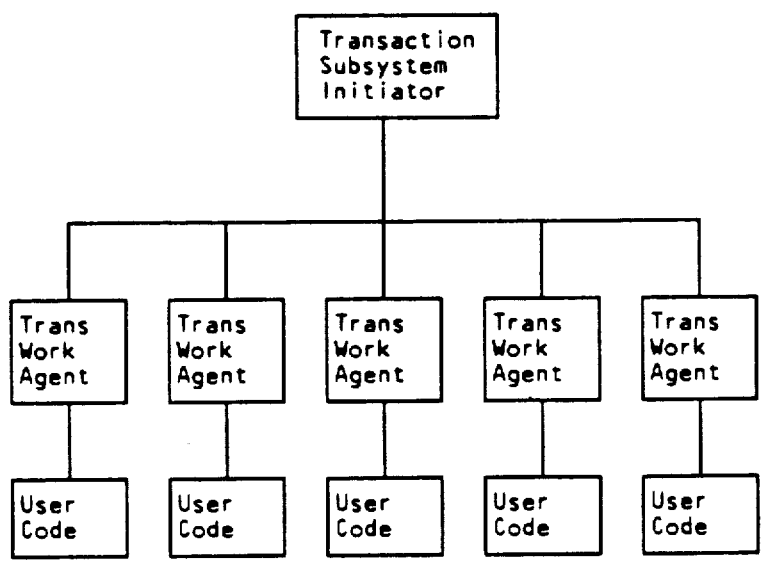
FIG. 6  Overview of Transaction Application Subsystem

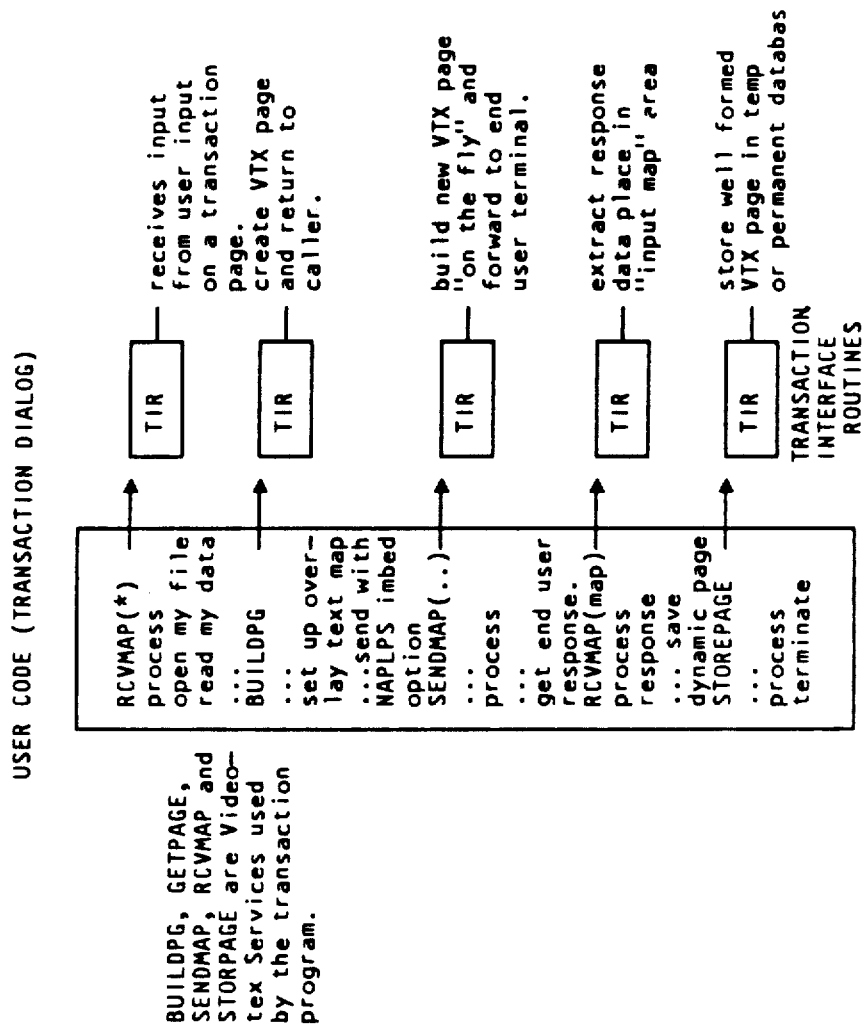
FIG. 7  Sample Transaction Program Outline

Overview of Transaction Data Areas

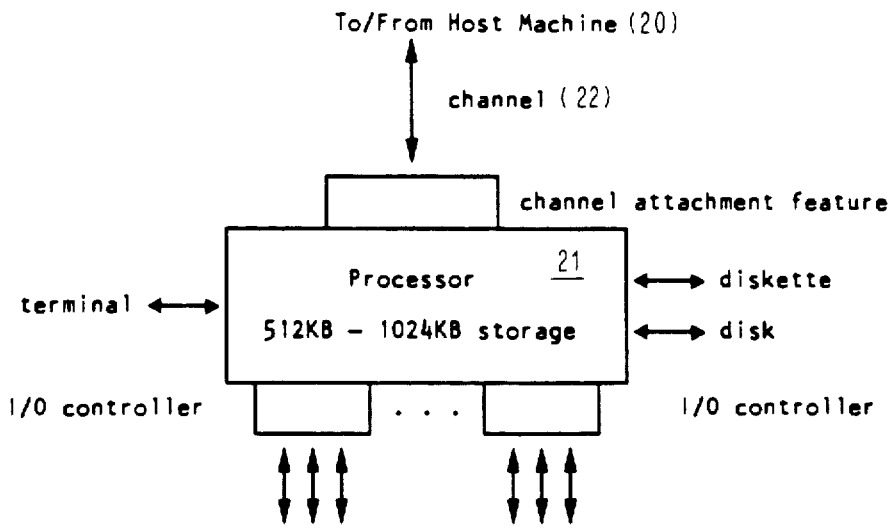
FIG. 10  Example Distribution Subsystem Hardware Environment
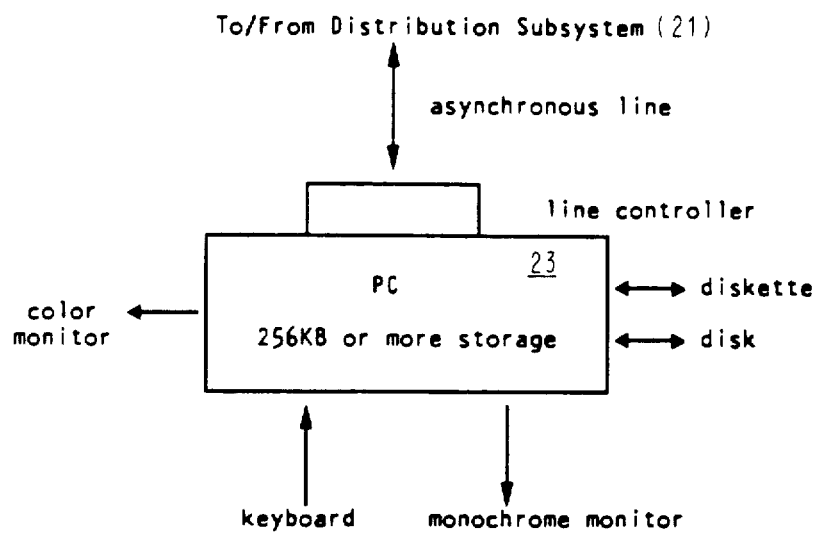
FIG. 12  Example Hardware Configuration for End-User Interface.

Distribution Subsystem
Software Overview

Software Configuration for End-User Terminal

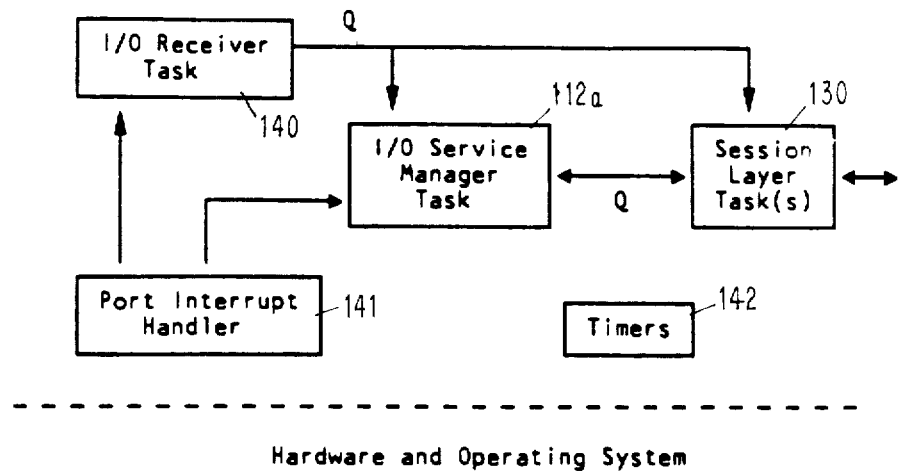
Hardware and Operating System
FIG. 14  IOCS Structure on the End-User Terminal
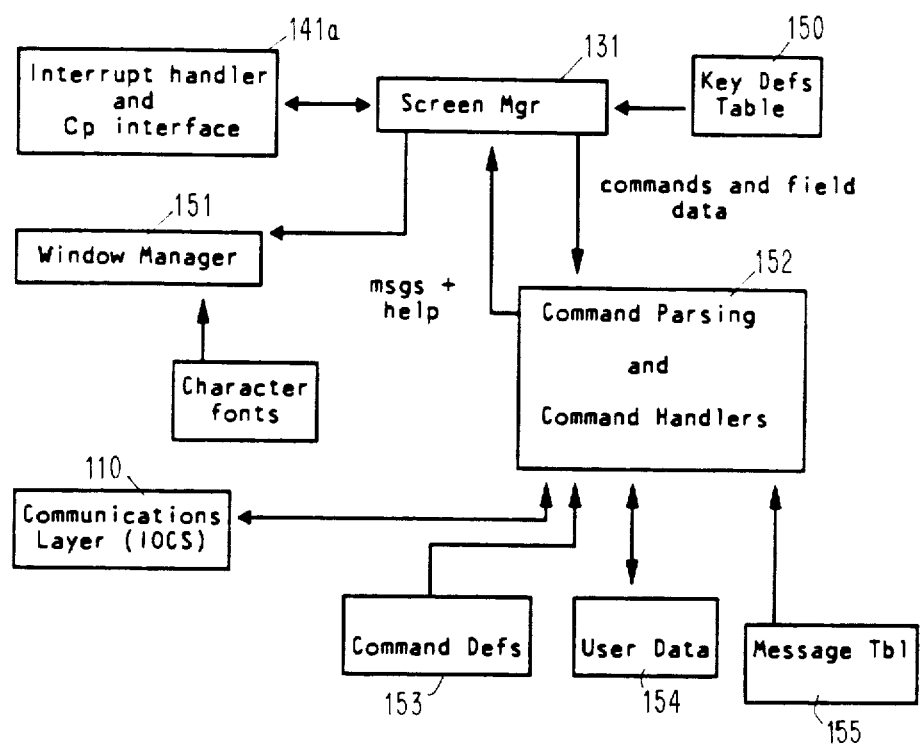
FIG. 15  Keyboard Processing on the End-User Terminal 4,805,134

ELECTRONIC SYSTEM FOR ACCESSING GRAPHICAL AND TEXTUAL INFORMATION

BACKGROUND OF THE INVENTION

The present invention relates to electronic information and communication systems and more particularly to a combination of operational nodes incorporating databases and application programs for providing graphical and textual information (Videotex) and transactional capabilities to end-user terminals connected thereto.

A Videotex service is a medium for conveying information electronically in an effective, user friendly, and relatively inexpensive manner to a large user population. It combines color, graphics and text in a single display to provide an attractive presentation of information to experienced as well as novice users. It is assumed that as its popularity increases the majority of users, while not being trained in data processing, will be interested in using it for message exchange and transactional activities, in addition to using it to access a wide range of information bases. Experienced users will generally wish to obtain specific information in a quick and direct fashion while novice users will tend to browse through databases trying to determine the value of the information being offered.

First and second generation Videotex services have tended to be limited both in the range of information bases offered and in the ability of the system to cater to the capabilities of a wide range of end-users. On the other hand, Data Processing Networks, such as the IBM VNET and the XEROX ETHERNET, have been developed to improve and integrate communication between and among individual computer terminals and databases. However, these networks essentially are either in-house, local area systems wherein the majority of the operating devices, work stations and data bases are proximately disposed, such as within an office or a plant, or are non-interactive and provide for a file transfer mode of operation.

Other networks such as the IBM Information Network (IN) and IBM's PVM systems do provide on-line interactive sessions between centralized data processing machines and their users who may be located remotely. However, these networks do not offer the consistent and easy-to-use interfaces for which Videotex services are well known.

With the increasing growth in large, centralized special-purpose databases along with integrated individual compact work stations capable of handling information presentations in color, graphics, and text (Videotex), the desirability of developing an extended architecture to foster cooperation among a wide range of remotely located terminals and databases has become manifest.

SUMMARY OF THE INVENTION

The present invention involves an architecture for and the implementation of an information utility for accessing information and executing transactions on an interactive basis between Videotex databases and individual end user terminals, some or all of which may be remotely located with respect to each other. A Videotex Application Network (VAN) toward which the invention is directed includes a combination of distributed, semiautonomous Operations Nodes (ONs), each characterized by (1) one or more affiliated users, (2) the inclusion of some form of database, and (3) one or more customized application programs. Each node is also capable of "stand alone" operation, that is, it can service the needs of its user population and need not be connected to any other node.

A typical Operations Node with end-user terminals, which may be referred to as an Establishment Operations Node (EON), supports a unique user interface through which users get controlled and secure access to a wide variety of databases stored locally and/or remotely. Through this node, users may also interact with a large number of application programs distributed over the entire VAN which provide additional and specialized services to users of the node. The user interface, the mechanisms for secure access to information, and the application environment supported by the ON are important features of the invention.

Provision is made for Operations Nodes to be adapted to special functions within the network. For example, while a typical node may consist of a system with one or more databases and end user terminals (EON), another node may consist only of specialized databases (DON) maintained by information providers (IPs) without end users or application programs. Similarly, a third node may merely consist of a directory databasee with a number of unrelated end user terminals (TON). An operations node may be configured with a directory database and just a set of application programs providing services to users on the network (PON). A number of small inhouse users may cooperate to form a multiorganization node (MOON) and special nodes may be formed to handle access to other networks (NON) or to interface with third party databases (ION). Finally, an Operations Node may assume the role of a Systems Operations Node (SON) which maintains a global directory of databases and application programs available at various nodes and may act to supervise and coordinate the interactions and operations of all the nodes in the system. In all, the application architecture and specific implementation disclosed offer valuable capabilities and services to end users.

BRIEF DESCRIPTION OF THE DRAWINGS

FIG. 5 illustrates the global data structure in an ON host.

FIG. 6 is an overview of a Transaction Application Subsystem (TAS).

FIG. 7 is an outline of a sample application program running under TAS.

FIG. 10 is an example of the hardware involved in implementing the distribution subsystem.

FIG. 12 is an example of a typical end user terminal configuration that may be connected to an ON distribution subsystem.

FIG. 14 provides details of the Input/Output Control System on the end user terminal.

FIG. 15 shows how keystrokes input by end users are processed by the terminal software.

DESCRIPTION OF THE PREFERRED EMBODIMENTS

Figure 1:
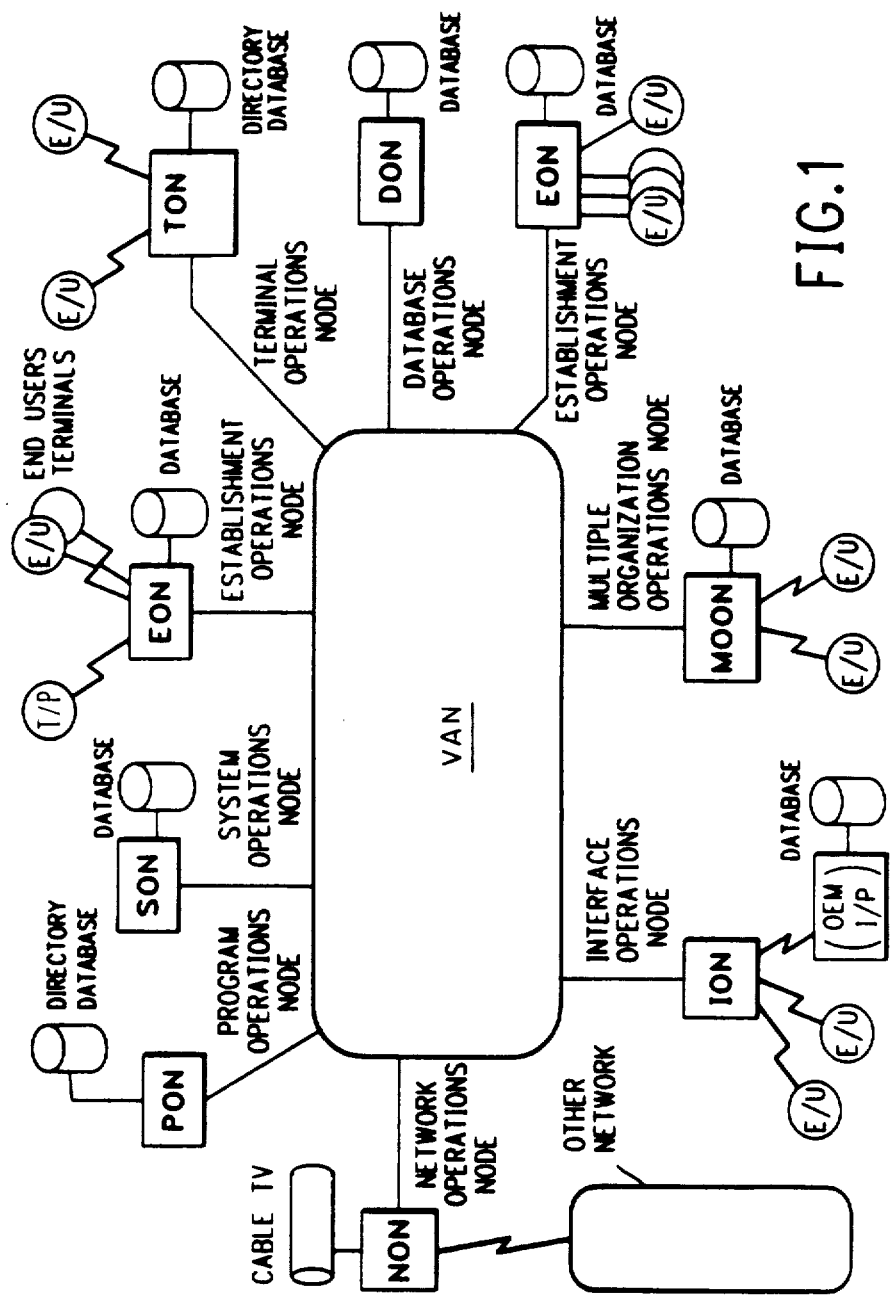
FIG. 1 illustrates a Videotex Application Network (VAN) in which the present invention may be implemented and various configurations that an Operations Node may assume.

A system generally embodying the main components of the present invention connected to a Videotex Application Network (VAN) is illustrated in FIG. 1. A fundamental component in the architecture is the Operations Node (ON), which is the unit through which all end-user terminals are connected to the system and wherein resides one or more databases with Videotex information available to other connected nodes. The nodes in their various forms, their interactions with end users and their services together make up an informaion utility or system.

First considering the system conceptually, all of the nodes, irrespective of their particular forms, are semiautonomous in that they are capable of many functions and operations on their own, that is, they may carry out in-house data processing and information exchange between their local databases and terminals without interacting with the system at large. The Operations Nodes are also distributed, that is, remotely located with respect to each other, and each may be connected to one or more other nodes in the system. The communications paths also support multiple concurrent "conversations" both from and to any particular Operations Node as well as between any pair of Operations Nodes. At the same time the paths are such that the addition or deletion of any one or more nodes causes a minimal amount of disruption to the network.

The VAN does not support a "single system image", so that each ON will recognize (hold a user profile for) only that set of users with which it expects to be dealing on a regular basis. Each such profile is identified by an ON-unique identifier. The identifier takes the form of an identification name, number, or symbol ( the ON-ID), concatenated with a System Access Code ( SAC ). The SAC/ON-ID combination is unique within the VAN. A user for whom there is an identifiable profile on an Operations Node is said to be affiliated with that ON. A user may be permitted to be affiliated with more than one ON. Profile records of a user at different ONs need not be identical; indeed, for various reasons of security and economy, a user may have different profiles at different ONs. However, a user can be serviced only at ONs with which he is affiliated. Servicing includes the process of logging on to the system, information retrieval, and the conduct of various transactional functions (e.g., data collection).

Information at an Operations Node is preferably organized in terms of pages. A page is a variable length data structure consisting of control information and displayable data. Displayable data in a page is normally encoded in accordance with the North American Presentation Level Protocol Syntax (NAPLPS), an industry standard, and preferably read out in color, graphics, and text form on a display device at the terminal of an end user.

Pages may be organized as scroll sequences for purposes of continuity of presentation, animation effects or for other reasons. Such sequences are known as pagesets. There is no conceptual limitation on the number of pages comprising a pageset. A group of pagesets that are related by some semantics may be recognized by the system as belonging to a database. Each such database is identified by a unique identifier in the form of an ON-ID concatenated with a Database Access Code (DAC).

Databases may be owned by Information Providers (IPs) who are responsible for their creation and maintenance.

An IP may be one person or may be an organization consisting of several people or entities, each with one or more assigned roles.

A VAN database is said to be local to an Operations Node if its pages are permanently stored at that ON and are maintained by privileged users (IPs) affiliated with that ON. Similarly, if the pages of a database are stored elsewhere in the VAN, such a database would be viewed as being remotely situated. In either case it is preferred that all VAN databases share a common welldefined structure, and the pages or pagesets of a particular database are always stored within and maintained by a single ON.

One or more exit paths may be defined for a page. These exit paths allow the user to navigate from the currently displayed page to another page. Two types of exit paths are defined. The first type, user-deined exit paths, are those that are derived by the system from the user's prior behavior. For instance, an exit path to the previous page displayed is known to the system because it keeps track of a limited history of page accesses by the user. Other such exit paths are described more fully below. The other types, Information Provider-defined exit paths, are embedded in the control area of a page and are invoked by certain functions also described below.

Users can request information from VAN databases and Third Party Databases (TPDs). Information on TPDs may be organized differently from VAN databases, but access mechanisms for the two types of databases are adapted to be very similar.

VAN databases, as mentioned, may be locally or remotely situated. However, because all such databases are structurally identical, accesses to non-local as well as local Videotex databases are carried out in such a way that the user is unaware of the locality of the databases. This is done by keeping implicit both the process of connecting to a remote ON for access to a non-local database, and the process of disconnecting from it when the user signals a context change.

VAN databases, whether local or remote, that are accessible from a given ON, have entries in the database directory of that ON. This directory enables the On to determine the location and type of the database in question. It is to be noted that not all VAN databases are necessarily accessible from every ON in the network. The accessibility of a VAN database from a given ON will typically be a matter of negotiation between the ON wishing access and the database-owning IP.

The procedures for handling accesses to TPDs, as mentioned, will be similar. An exit path from a local or remotely situated VAN database page will indicate that a page from a TPD is to be retrieved. Like VAN databases, TPDs are also represented by an entry in the ON's database directory. If the requested TPD is accessible from the ON with which the user is affiliated, then an entry will have been set up in the ON's directory. This entry enables the ON to make requests to the (external) system on which the TPD is resident. The TPD system, while maintaining its databases independent of the VAN, will recognize the page, pageset, and database semantics in order to carry out a meaningful access session with the VAN user. The particular manner in which communication between a TPD system and the VAN is conducted will vary and be within the purview of those skilled in the art and so will not be discussed here in detail.

END-USER FUNCTIONS

A comprehensive repertoire of functions is available to the end user to access information within the ON with which he is affiliated as well as on other ONs. These are discussed in this section in the context of using a computer keyboard at the end user terminal to call up and control function operation and display.

A scroll function allows the end user to access pages in their sequence order within a pageset. The user may scroll forward to access the next page in sequence or may scroll back to access the previous page. The point of reference in scrolling is always the currently displayed page. The exit paths associated with scrolling are always embedded in the control section of the currently displayed page's data structure.

A retrace function allows the end-user to trace back (in time sequence) to pages previously displayed. The exit path for the retrace function is derrived by the system based on past user actions.

A menu selection function allows the end user to make a selection of an integer within a given range such that each such selection causes the system to undertake a potentially different exit path. Each such exit path must be defined in the control section of the currently displayed page. The various types of exits for a selection are:

Null: This path indicates that the selection is currently inactive and is therefore not a valid exit path.

Direct Reference: In this case, the exit identifies uniquely a page within some database in some Operations Node within the VAN.

Description based search: This exit provides a program identifier that is invoked by the system. The program conducts a search of the current database according to some search criteria and produces one or more pages containing the results of that search. The criteria may be provided by the end-user in the form of responses to prompt strings specified in the exit path.

Program Trigger: This exit is a generalization of the description based search exit. Whereas the description based search exit provides for the activation of a special purpose program to search a VAN database, program triggers allow for the activation of any program. The logic of such programs may not be known to the system.

Command String: This exit allows for simulation of other types of exits from within a menu selection. For example, this exit may be used to simulate the scroll function described above.

It should be noted that not all pages may have menu selection exits defined in their control sections. A page that has menu selection defined for it is known as an index page.

A find function permits a page within a database to be accessed directly by a user. The find function requires the user to specify the database name, the pageset and page identifiers. A user session manager at each ON will maintain context (or present state) information for every active user. The database context of a user is the database to which the currently displayed page belongs.

Because the current database is always known to the system, a user need not specify the database name if he wishes to find a page within the current database. An IP intending to create a database for access by the VAN user community must specify a database name which is used by the session managing ON when accessing that database on behalf of a user. An IP may own more than one database within an ON.

A backup function is used to display the last index page prior to display of the currently displayed page. Successive backups works backwards through a (limited) sequence of previously seen indexes.

A next function is used to take the next exit path on the last index page displayed prior to the display of the currently displayed page. It is equivalent to a backup followed by an increment of the choice number, saving the intermediate display. Its prime use is for browsing through a list of items.

A mark function causes the system to "remember" the currently displayed page for later access via a recall function.

A recall function is used to display the page that was "marked". If several pages are marked before a recall is issued, the most recently marked page will be displayed. Context information is saved with the mark and restored with recall, so that if the end user has retrieved a page via menu choice, marked it, and later recalled it, the backup function would return to the menu from which the end user originally retrieved the page.

A define function allows the end user to define synonyms for the currently displayed page or to define string substitutions. Thus users may "name" often-displayed pages with identifiers that are most meaningful for them and have such pages accessed by name at a later time. String substitutions allow users to abbreviate frequently used command strings.

A tell function displays the definition of a specific synonym or all the synonyms.

A last command function causes the system to display the last command string that was entered by the user. Successive "last commands" work backwards through a sequence of previously entered commands, eventually returning to the newest command in a circular form. Last command has two corollary functions, as well. One moves through the list in the opposite direction and the second repeatedly retrieves the most recent command without moving through the list of saved command strings.

A home function causes a previously designated page to be displayed and restores the end-user to a known state.

A cancel function allows the user to terminate processing of the last function by the system.

A help function may be invoked by the user to display information about how to use the system or to provide information pertinent to the currently displayed page.

A reshow functin redisplays the current page.

A capture function saves the current page in a file local to the end-user terminal for offline review.

An unsolicited keyword search function allows the user to enter a term that represents a topic covered within the current database. The user is presented with a menu specifying the pagesets within the database that cover that topic. The user may then examine the "hits" if desired through simple menu selection or the other navigational functions. Keyword search lets the user break out of a menu hierarachy more directly to a topic of interest.

SYSTEM/USER INTERFACE

Screen Management

The display area on the end-user's terminal is controlled by the use of multiple overlaying windows. The use of such windows facilitates management of the contents of the screen without losing information that may be important to the user, and provides for adequate and timely interactions between the user and the system.

In the following discussion, several types of windows are described. These windows overlay the underlying page image when necessary and the overlayed area is always restored when the window is no longer needed.

A Command line window—appears, for example, at the bottom of the screen whenever the end user begins typing something during a display mode. (Dispaly modes will be described later in this section.) The command line window is preferably wide enough to accommodate a single line of text and function key definitions. The command window can be made to disappear (and have the underlying screen restored) by pressing a pre-designated key. This key can be used to toggle between the command window and the underlying screen. If the key is not used to toggle between the window and the screen, the window will appear when the user begins a command sequence and disappear when the command has been accepted for execution by the system. One of the customization options would be the placement of this command window, e.g., at the top of the screen or bottom of the screen, and another would be the specific toggle key.

A Prompt window—allows the system to prompt the end user with a short text string and obtain a response back. This is used in conjunction with program triggers that require one or more parameters from the user. The prompt window appears when a user makes a menu choice requiring a prompt and disappears after user input has been received.

An Action menu window—is a window of variable height (depending on the number of action items). The window appears on the screen when an action key is pressed and disappears when the user has selected a choice from the action menu. (The action key and its use are described below).

A Message window—allows the system to put up informational and/or error messages. Error messages usually appear in response to a command that could not be executed by the system for some reason (e.g., security violation, page not found, etc). The message window disappears when the user strikes a key to begin a new command string. The message window may also be used for display of one-line messages sent to one end user by another end user.

A Help text window—is used to show brief help information. The amount of information will not normally exceed a few lines. Its location is also subject to customization.

Modes of Interaction

There are two distinct modes of interaction which the user might be in at any time, a display mode and an action mode. Once the user has successfully logged on the system, he is deemed to be in the display mode.

In the dispay mode, the user can invoke all of the information access functions which include: SCROLLING; MARK/RECALL; MENU CHOICE SELECTIONS and accompanying prompts, if any,; BACKUP/NEXT; RETRACE; TELL/DEFINE; FIND; HOME; HELP; AND CANCEL. Any of these commands may be invoked via a function key/synonym combination on the terminal keyboard. Such function keys may be defined in one of three ways: (1) shorthand cursor control keys, such as those that move the cursor back to the beginning of the line; (2) shorthand keys for a text string; and (3) keys for direct mapping into a command. Cursor control functions never leave screen management and are thus not of particular interest here. Type (3) keys are routed immediately for processing as they already represent the encoding of a command. Their functions are not echoed to the screen since they have no text, nor are they saved in the list of recent commands.

Type (2) keys that map into text, further subdivide into two types—those that have termination characters and those that don't. The outputs evoked by those that do are taken up for execution immediately, while the outputs of those that don't are displayed on the command line as if they were just typed and the end-user may proceed to edit the line before pressing the <ENTER> key to initiate command processing. A key need not map into an entire command. It may simply be shorthand for a common text string, with the end user supplying the rest of the command. The <CANCEL> key has the effect of aborting the execution of the current command, if any. Function keys are defined by the user during a customization session, with a set of default definitions otherwise provided.

During display mode, only one command may be under execution for a given user; in addition, the system will accept one or more type-ahead characters for pending analysis. The user does not leave the display mode unless he explicitly requests the system to do so. Thus, he may view Videotex pages and transaction pages without leaving the display mode.

An action key is defined that activates an action menu window. The action key may be pressed at any time during the display mode. The resultant action by the system is the same, that is , it displays a window containing the action items that are valid on that page. For example, on a database page, the valid actions might be: (a) quit the action mode; (b) save the page on the personal file with a name tag; and (c) enter message preparation. On a transaction page, the action items may be all of the above and some other items such as fill-in fields or activate transaction. On a message page, the action items may include message editing in addition to others already mentioned.

As in the case of display mode commands (except CANCEL), an action key is effective after the current command has been executed ,i.e., it is not preemptive.

During the action mode, the following display functions are suspended: RETRACE; BACKUP/NEXT; SCROLLING; MARK/RECALL; TELL/DEFINE; FIND; AND HOME commands. Only the CANCEL and HELP commands are active. The command line window is closed during the action mode. If any of these functions are invoked through function keys, the system will: (a) display an action window reminding the user of the things he can do at that point (a sort of help window); and (b) give him an error message and wait for the user's next move.

If the action key is pressed in the action mode, the system responds in a manner very similar to its response in the display mode. It provides an action menu window for the user to select an action item appropriate for that page and at that time. For example, during the fill-in period of a transaction, the actions that are valid are: (a) quit (same as CANCEL); (b) fill-in ( which puts the user back where he was); and (c) send ( which sends the filled-in fields back to the transaction program for processing).

APPLICATION PROGRAMS SERVICES

While information access functions as described above allow a VAN user to browse through databases and conduct specific searches, an information utility would be incomplete without providing the user the ability to act upon the information he/she has obtained from the utility. Accordingly, one of the major services provided by the VAN system is giving an end user the ability to invoke an application program in a controlled fashion. These are generically known as transactional services. Three types of such services are identified; program triggers; value-added page creation; and transactions.

Program Triggers are programs that are invoked and executed as a result of the user making a menu selection on an index page. Program trigger identification must be imbedded in the currently displayed page's control section. Program triggers usually require the input of one or more parameters from the user who invokes the trigger. These parameters are solicited by prompt strings that are also imbedded in the control section of the currently displayed page.

With Value-Added Page Creation, when a page is retrieved from a VAN database, it is possible to enhance the value of that page to a user by "adding" current and/or specific information to that page prior to displaying it at the user's terminal. Such a feature is enabled by the invocation of a program that merges the retrieved page with data that the program has derived from other sources.

Transactions are programs that can conduct an extended dialog with the end user subsequent to their invocation by some overt action by the end user. (Transaction invocations are covered in detail under System/User Interface above.)

There are many differences between a transaction on the one hand and program triggers and value-added page creation on the other hand. First, transactions are conducted in a mode where information access functions are suspended, while program triggers and value-added page creations are conducted in the information access (i.e., display) mode. (Modes were also described in detail under System/User Interface above). Second, transactions are capable of multiple exchanges of data with an end user while the other types of program services are capable of single exchanges ony. In spite of these differences, all application programs are subject to the same generic access control mechanisms as described in the following section.

RESOURCE MANAGEMENT AND ACCESS CONTROL MECHANISMS

Accesses to information on local and non-local Videotex databases, and transactional services (both local and remote), are controlled through a variety of mechanisms that will now be described.

User Validation

Each user known to an Operations Node has a profile under the control of the ON. Access to the system is controlled by a user ID and password combination that must be provided by the end-user and that must match the stored values. The password, expiration date, and last password are stored in a separate area from the rest of the profile. Additionally, the password is stored in an encrypted form. Passwords are known only to the owner of the corresponding user ID. The System Administrator will not normally have the passwords of the users of his system. He may however change a particular password to a known value in the event the owner forgets his/her password and requests a new one. Such a scheme provides for maximum protection of the user's privacy while maintaining the ability of system personnel to intervene if necessary.

User Groups

One or more user groups may be defined in an Operations Node with the purpose of providing collective access rights to database and transaction resources. Membership in a group will entitle an end-user to the rights associated with that group. Users may be members of not only user groups defined in the ON to which they are affiliated, but groups at other nodes as well. This allows a user to enjoy access to databases that are remotely situated without explicit authorizations at the remote ON.

Resource Classes

In addition to users and user groups, there are two major classes of resources within each Operations Node. These are VAN databases and VAN transactional serices. These resources are defined to the system in a manner similar to defining users and user groups. The attributes of databases and transactional classes are diferent.

Access to databases is controlled by a two-level check. The two levels are independent of each other. That is, a successful check at one level does not imply success at the other level. The first level is called the database check and the second level is called the page level check.

The database level check operates as follows. Databases must be defined to be public or private. If a database is defined to be public database checks are always successful. If a database is defined as being private, database access must be explicitly granted. This is done by interrogating an access list that is maintained by the system for that database. An access list contains the identifiers of users and user groups that have varying types of accesses to the associated database. If the database level check is successful for an access request, the page level check is then performed. This is done by matching a zone number associated with the page referenced by the request and a zone number occuring in the capability list of the user making the access request. The zone number may be viewed as a mechanism for partitioning a database into secure areas to which users may have selective access. A user's capability list for a database is a list of zones to which he/she has access.

Page level checks are also carried out against access requests on public databases although no database level checks are required. It should be noted that zones and capability lists need not be defined for every page and for every user. In many instances, where system operators wish to run an open system, access control mechanisms may be disarmed by the absence of the controlling data structures.

Transactional serices may also be defined as being public or private. If a transaction is defined as being public, it may be invoked by any and all users. If it is defined as being private, invocation is limited to those users (and members of user groups) whose identifiers appear on the access list of that transaction resource.

ON CONFIGURATIONS AND CONNECTION MECHANISMS

The architecture of the Operations Node permits it to be configured in a number of different ways to satisfy different requirements (see FIG. 1). A Videotex Application Network (VAN) incorporating the present invention generally includes a combination of distributed, semiautonomous Operations Nodes (ONs), typically characterized by (1) one or more affiliated users, (2) the inclusion of some form of database, and (3) one or more customized application programs. While each node is capable of "standalone" operation, that is, it can service the needs of its user population and need not be connected to any other node, its capabilities are considerably enhanced by its membership in a VAN.

A typical Operations Node with end-user terminals, having Videotex displays, and suitable databases and application programs, which may be referred to as an Establishment Operations Node (EON), supports a unique user interface through which users get controlled and secure access to a wide variety of databases stored locally and/or remotely. Through this node, users may also interact with a large number of application programs distributed over the entire VAN which provide additional and specialized services to users of the node. The user interface, the mechanisms for secure access to information, and the application environment supported by the ON are important features of the invention.

An Operations Node that is dedicated to Videotex database creation and maintenance, but handles few or no end user terminals is known as a Database Operations Node (DON). Such an ON may be shared by a number of IPs to achieve economies of scale and dedicated service for IP functions.

A Terminal Operations Node (TON) provides Videotex service to a set of end-users and their terminals. Few or no VAN databases are resident at such a node, typically only a directory database. All or most database accesses are for remotely situated databases. The utility of such a node derives from user populations that generate no information bases themselves but rely on remote databases for all or most of their information needs. A TON performs a largely terminal concentration function fo the VAN.

A Program Operations Node (PON) is one that consists of a set of application programs that may be invoked by end users that are remote from the node. A PON supports no end users nor does it have any local Videotex databases, only a directory database. Application programs resident at this node are available for use by users on other nodes. PONs may be considered to be service machines on a VAN.

A Multi-Organizational Operations Node (MOON) is an ON that provides Videotex services to a collection of organizations that cannot project a sufficiently large user or database requirement to justify the cost of providing their own ONs. Databases belonging to different organizations are secured from unauthorized access through the use of security mechanisms described above.

Connections to established databases on a third party system may be accessed via special protocols between the third party system and an Operations Node. An ON that provides access to TPDs for other ONs on the VAN is termed an Interface Operations Node (ION). Interface Operations Nodes may be implemented by using specialized application programs in an otherwise normally configured Operations Node. The specialized program implements the protocol between thrid party systems and the VAN.

A network Operations Node (NON) may be established that is dedicated to the handling of access to other networks external to the VAN.

An Operations Node whose database directory contains information about all of the databases on the VAN and whose transaction directory contains attributes of all the application programs within the VAN is termed a Systems Operations Node (SON). Other Operations Nodes on the VAN may query the SON for information regarding the existence and availability of databases and application programs. Although the SON contains valuable information, Operations Nodes on the VAN can continue to operate in the absence or failure of a SON. In addition to maintaining directory information, the SON may contain statistical and usage data related to the performance of other ONs.

A local computer system can attach to the VAN in a number of different ways. The preferred method of attachment for a database system is via direct connection as an ON. This provides full membership in the VAN and allows the use of all support facilities. It requires complete adherence to the VAN architecture and participation in the operations of distributed control mechanisms.

Instances may arise in which it becomes desirable to attach certain local database systems to the VAN in an explicitly auxiliary manner. This can be done by means of IONs that assume responsibility for properly representing their associated database systems in a manner consistent with the VAN architecture. The IONs thus handle all aspects of network participation. The third party systems must simple adhere to the certain gateway protocols. This protocol is embodied in the ION communications access method. The third party systems must thus support the interconnection and presentation specific gateway interface, but need not change any application level code.

A local computer system may attach directy to a particular ON as a Transaction Processor (TP) in support of Videotex applications resident at that ON that require extensive processing or external data input, manipulation, or storage. Such attachments are made on an individual basis according to the needs of local applications, and the Transaction Processors involved typically do not have a VAN appearance.

A similar type of attachment can be used however to obtain a network appearance for external applications that are not even necessarily structured in terms of Videotex. This is accomplished by providing a Videotex application at an appropriate ON expressedly for the purpose of treating the external application as a supporting program in an attached Transaction Processor.

ARCHITECTURE

Underlying the architecture of an Operations Node is the concept of functional partitioning Functions performed by an Operations Node are distributed among multiple processors in a manner designed (a) to take advantage of processor capabilities, (b) to utilize existing software program products, and (c) to enhance usability of the system.

Figure 2:
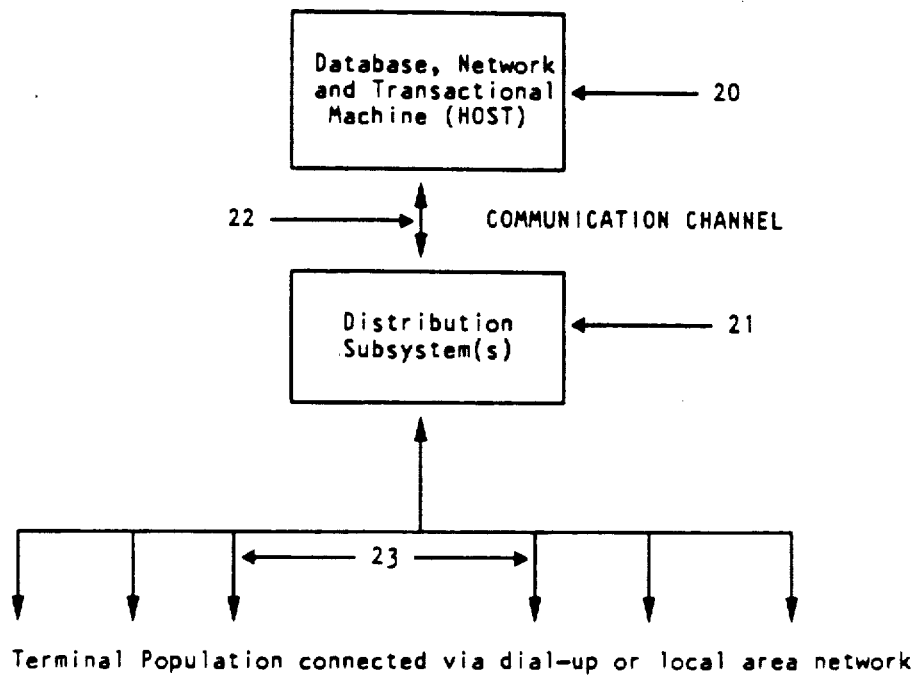
FIG. 2 shows the overall architecture of an Operations Node (ON) in accordance with the present invention.

FIG. 2 illustrates the overall functional distribution. A host machine 20 is representative of a family of machines capable of a wide range of performance. An example familly is the IBM 370 class of machines. The host machine 20 provides for database residency, access to remote videotex databases, store-and-forward messaging and for management of application programs.

A distribution subsystem 21 is responsible for management of user terminal communications, caching of data that has already been retrieved from the host 20 and for protocol conversion from an end-user terminal 23 to the host machine. An example of such a distribution subsystem processor is the IBM Series/1. The distribution subsystem 21 is attached to the host machine 20 via a high speed communication channel 22. An example of such an attachment is the IBM Series/1 System/370 Channel Attachment Feature (see FIG. 10).

End-user terminals 23 are intelligent, programmable devices that share in the management of user sessions. The underlying philosophy in determining the role of these intelligent terminals is to offload as much of the system/user interface functions as possible, while remaining consistent with their capabilities and limitations. An example of a device that could be used as an end user terminal is the IBM Personal Computer (PC) (see FIG. 12).

OPERATIONS NODE HOST CONFIGURATION

Figure 3:
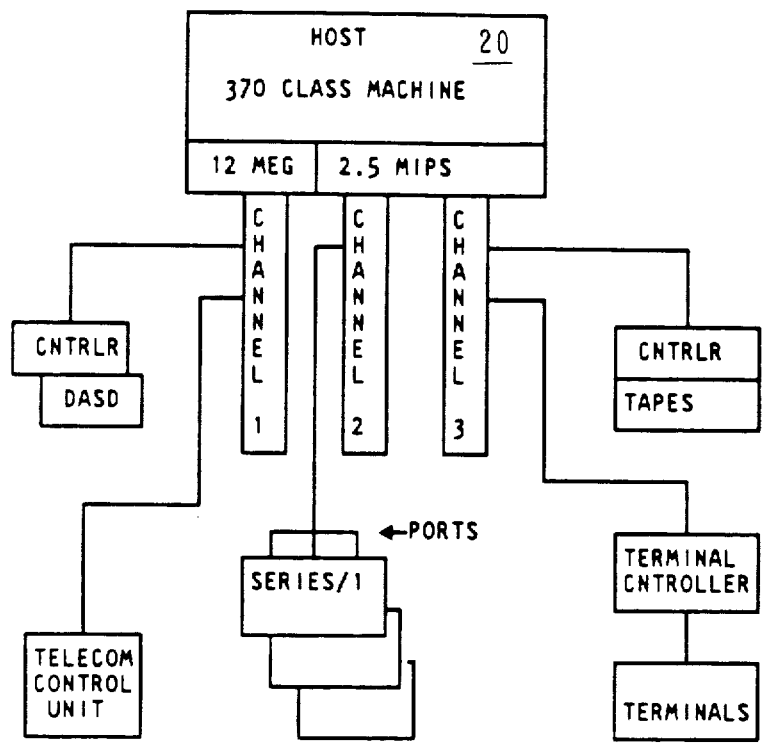
FIG. 3 is an example of a hardware and software configuration for an ON host.

FIG. 3 shows a sample hardware configuration and the Table below shows the software required to execute the functions of the ON host. A 370 class machine is shown but configurations using alternate hardware, such as the DEC VAX/780 or Amdahl 400 series machines, can be used with an equivalent set of software components.

The host software is divided into two parts: components that are part of the system control program (SCP), such as MVS, or that are readily available in conjunction with the SCP; and components that implement specific functions described earlier in this specification. The remainder of this section will describe the components of the host that are specific to the present invention.

Firstly, by way of example, the following Table lists the host software that can be used in conjunction with the hardware components shown in FIG. 3.

TABLE of EXAMPLE HOST SOFTWARE to IMPLEMENT ON FUNCTIONS on FIG.3 HARDWARE

| | |
|---|---|
| 1 - MVS/SP1.3.X | 6 - DFP/370 |
| 2 - JES2 or JES3 | 7 - ISPF/PDF |
| 3 - RACF | 8 - TSO/E R2.X |
| 4 - DATABASE 2 (DB2) | 9 - ON Components (See below) |
| 5 - VTAM V2.X | |

ON HOST COMPONENT DESCRIPTION

The following is a list of components that comprise the ON Host specific software.

Host Control Program
Distribution Subsystem Communications
Component Communications
Process Control
Resource Management
Data Management
Session Management
Application Programs Management.

Figure 4:
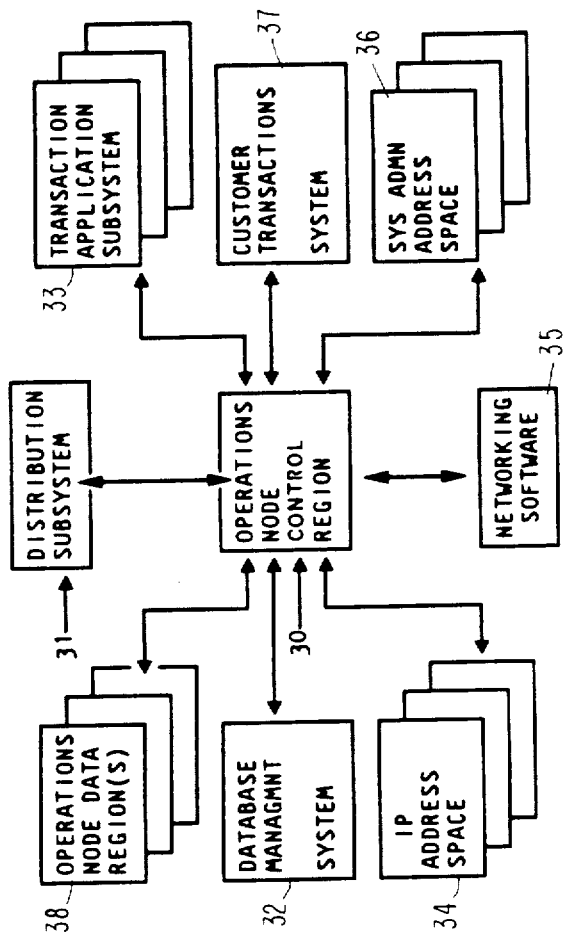
FIG. 4 shows the relationship of ON-specific software to other exemplary components that may exist on an ON host.

FIG. 4 shows the interaction between the various components. The Operations Node control region 30 is the nerve center of an ON. It consists of a number of components that are discussed in detail below. Briefly, the control region 30 can handle requests from the distribution subsystem region 31 for information retrieval and application program initiation. The control region also communicates with a database management system 32,38 for execution of complex queries on behalf of end users. It can maintain sessions with other Operations Nodes via the networking software 35. It provides data and control paths to regions 33,37 where application programs may be executed. It communicates with Information Provider (IP) regions 34 to satisfy requests from IP's as well as from system administration personnel 36.

Host Control Program

The ON host control program 30 is responsible for invoking the appropriate component initialization routines. The first routine invoked is the control-data module. This module opens certain control files containing system configuration data. This configuration data identifies the command handler modules that make up the application layer of the host software as well as system tuning parameters. The control program is also responsible for loading the command handler modules and building a table of entry point addresses, called the EPATABLE, to provide global accessibiity to command handler services. The control-data module must then allocate and anchor the Host Global Data Block (see FIG. 5). The tuning parameters are used as input in initializing certain system control fields in the global data block. Some typical tuning parameters are: (1) identifying the current Operations Node; (2) the maximum number of local users allowed to logon; (3) the maximum number of remote user sessions; (4) the minimum and maximum number of work agent tasks; (5) whether or not tracing is active and statistics are to be collected; (6) the maximum number of retry error counts; (7) what type of caching is desired; etc.

When the control-data module returns control to the host control program, the remaining system tasks are started. These are Port Receive Task, Port Transmit Task, the Operator Control Task, Timer Task, and lastly the Work Agent Tasks. Each of these tasks perform some additional initialization functions. Once the supporting subtasks are in place the control program systematically searches the EPATABLE for modules that have been identified as component initialization routines These component initialization modules are executed sequentially, according to their positions in the table.

Distribution Subsystem Communications

The primary function of component of region 31 is to maintain communications with the distribution subsystems 21. The architecture supports a multiple port connection to the distribution processor. The host can support multiple distribution processors as well. The minimum port configuration between the host and any given distribution processor is one receive port and one transmit port, although two transmit ports are the norm. It has been determined that under certain hardware configurations such as shown in FIG. 3, two transmit ports make more efficient use of the channel path, whereas one receive port from the distribution processor is sufficient for handling traffic from the distribution subsystem. The architecture can support a maximum of 32 ports in both directions. The distribution subsystem I/O configuration is parameter driven and read in by the Port Transmit Task during its initialization processing.

There are two support tasks which handle all local communications between the host and the distribution subsystems: the Port Receive Task and the Port Transmit Task. As can be inferred from their names one task handles all traffic coming from the distribution subsystem(s) and the other all traffic to the subsystem(s). Having two asynchronous tasks to handle two-way communications allow the application to assume a full duplex communications channel regardless of the underlying hardware. The absence of a conversational protocol, necessary in half-duplex connections, not only mitigates the complexity of the algorithms but enhances the throughput as well. There is no need for the additional hand shaking necessary to change modes as in typical conversational protocols, that is, request to send, clear to send, negotiate bind, etc. The receive protocol is simple: the distribution subsystem sends whenever it is activated and the host receives on demand. The underlying assumptions are that the host is interrupt driven and can accept data as fast as the distribution processor can send it. The transmit protocol, on the other hand, requires somewhat more sophistication because of the likely variance in processor speeds. The host must first receive an acknowledgement from the distribution subsytem indicating that it is ready to receive a subsequent data block.

Once a data unit has been received by the host, the Port Receive Task adds to it a host header before placing the element or the "work unit" on the input queue. This input queue is termed the dispatcher queue. The Port Receive Task then reissues a read for the port just serviced and checks for any other ports requiring service. If no other ports are active, the task waits for interrupts from all ports.

The Port Transmit Task waits for multiple events. Event type one is a request queued to the Port Transmit Task's input queue. Event type two is the acknowledgement issued by a distribution processor freeing the port for subsequent traffic. When awakened by event type one, this task obtains elements from its queue and sends them to the appropriate distribution subsystem. The task continues this activity until all queues have been exhausted. If awakened by event type two, the corresponding port is reenabled for I/O.

Component Communications

Intercomponent communications are done through queues. All queues reside in the host control region and are managed by multiple consumers and producers of queued work. For example, as mentioned earlier the Port Transmit Task manages its queue, in that it is the only consumer of this queue. Many components may participate in producing work for this queue. Certain application level modules known as command handlers produce Port Transmit queue elements when performing the function of sending response data back to the originating distribution subsystem.

Another queue mentioned earlier was the dispatcher (DSP) queue. The producers of work for this queue are all programs that wish to introduce work to the host system. Placing work on the DSP queue eventually resolves into invocation of a particular command handler which handles the request. Typical producers of work for the DSP queue are: transactions, TSO programs, IP support programs, external network software, and even batch jobs. The sole consumers of work from the DSP queue are the Work Agent Tasks. These tasks will be discussed in greater detail in the Process Control section below.

All producers and consumers of queued work units use a common queue access method software, referred to as the "scheduler". The generic term "scheduler" refers to a series of modules which perform the queue operations of GET and PUT on behalf of callers both internal and external to the host region. There are several unique requirements of these modules that should be met, to accommodate such a wide variety of users. These include:

sensitivity to where (what address space) the caller is running;

the ability to move data across address spaces;

the ability to execute on behalf of both supervisor and problem programs;

providing levels of authorization for priviledged operations; and providing a single interface to all callers.

Process Control

The level of concurrent command processing is reflected by the number of executing Work Agent tasks. The purpose of the Work Agent is to provide an execution environment for command handler routines that may be invoked on behalf of some user-initiated activity. The user in this case is the end user, working at his or her terminal. If there are ten users logged on and only five agent tasks in the system, then there can only be, at any given time, a maximum of five concurrently executing commands. Any additional requests queued to the DSP queue would remain on the queue until an agent task was freed. The CPU scheduling algorithm assumes as its model a time sharing environment.

It is vital in any online system to present to the user an interface with some degree of consistency. The response time should also behave in a consistent manner, in that all users perceive a uniform response. In other words, the system should equitably distribute the CPU resource to present a reasonably consistent response to the end user. For example, if there are ten users that request a display of a page at roughly the same time, the system response would seem extremely erratic if the request were handled serially. The first request received would be extremely fast and the last request would be extremely slow. However, if requests were processed concurrently, allocating CPU resource in spurts, in a round robin fashion, then no one request dominates the CPU, thereby allowing for a more uniform response. Taking into account the full set of cooperating processors in the VAN, user response will be effected by a number of other factors. The request may be resolved at different points, or in fact the request may never reach the host. The above example assumes all requests reached the host and were resolved at the same point.

With the present invention the operating system allocates CPU in task priority order. The Work Agent tasks are given a task priority by the order in which they are attached. This means that the first agent will always get the CPU if it has work to do, and the second agent task will run only if the first is idle, and so on. Allowing the operating system to dispatch these tasks in the normal fashion would also distort the user response, according to which agent obtained the users request and his associated priority. Because of this condition the host control program influences the operating system's dispatching algorithm.

An additional function of the host control program is to control the allocation of CPU resource. It is instructed by a third task called the Timer Task, when to take the CPU away from the currently executing agent, to allow the next agent to execute. All three tasks, Timer, Control Program, and Work Agent, participate in the CPU scheduling activity. The Work Agents calculate the elapsed execution time of every command. These times are used by the Timer Task to calculate an appropriate time slice or quantum. The Timer Task dynamically adjusts the quantum according to shifts in the work load (it samples the recent history of elapsed execution times). The Timer sleeps for the duration of a time slice. When awakened, it contacts the Control Program which knows that it is time for another agent. The Control Program then forces the Work Agent Task to relinquish control and causes the operating system to place the Work Agent Task at the end of the dispatcher (DSP) queue. The control program keeps track of which agent is currently executing. This process is continuous. When the system is idle, the Timer Task sleeps for a longer duration, thereby decreasing the CPU overhead attributed to the scheduling activity.

Resource Management

The ON host makes use of unique resource identification numbers that provide the basis for a centralized resource management methodology. These numbers or resource tags have been termed "Access Codes". There are three types of resource tags, each type signifying a different resource class. A Database Access Code or DAC identifies the database resource class. A Transaction Access Code or TAC identifies the transaction resource class. The third resource class is the User Class. Users are identified by a number called the SAC or System Access Code. All access codes are obtained from the same pool of available ID numbers, making resources uniquely identifiable.

Having unique numbers identify particular resources provides for efficient management of data structures representing resource elements. For example, all control data, be it database directory elements, transaction directory elements, or user session management data, is anchored and manipulated from a common data structure and by a common resource management services routine. These resource elements are contained in an incore structure known as the Resource Control Table.

The combination of resource tag and Operations Node ID (ON-ID: a two byte ID number uniquely identifying an Operations Node as a member of the Videotex Application Network) will uniquely identify a given resource on a network wide basis. For example, a SAC/ON-ID combination uniquely identifies a given user. This facilitates global manipulation of resources throughout the network. The Resource Control Table (RCT) also provides for ON-ID qualification of resources, thereby allowing one structure to reflect all resources known to a given node. If node "A" has access to the RESTAURANT databases located at node "B", it would have an entry in its RCT that reflects the DAC/ON-ID number identifying the RESTAURANT database at node "B".

All resource element data (User, Database, and Transaction Directories) is backed by DASD. The Resource Control Table is built at initialization time from resource data contained in a secure dataset.

In the example implementation shown in FIG. 3, Resource Access Control Facility (RACF), an IBM program product, cited in the Table in connection with FIG. 3, may be used as the resource access control tool and is also used as an access method and a repository for host resource data. All three types of resources have corresponding RACF profiles. Other implementations may use comparable resource management tools with equivalent functions.

Data Management

The host deals primarily with Vidoetex pages as its object of data manipulation. These pages are stored in a relational table controlled by a relational database management system. In the example implementation shown in FIG. 3, the IBM program product DB2, cited in the Table, may be used as the database management system. Other implementations can use comparable DBMS with equivalent functions. After a page is retrieved, it is optionally buffered in virtual memory, thereby decreasing subsequent retrieval times. This is called "host caching" of Videotex pages. The cache is maintained across host sessions. When the host is brought down the contents of the virtual memory cache are saved in secondary storage.

The page manipulation software is responsible for a full range of operations: retrievals, insertions, deletions, and modifications. It is also responsible for identifying the target database, automatic initiation of remote page operation requests, enforcing database availability protocols, and enforcing user database and/or page access authorization requirements. These routines take advantage of certain basic host services in performing their required functions. For example, during a remote page retrieval, the requesting user's session data must be known to the remote node. Page operations software invokes user session management routines to obtain the appropriate data, if it is not already accessible. In this particular case an "implicit logon" would be performed on behalf of the remote requestor if this was his first reference to any database on this node. For local retrievals, this would not be necessary as the user session data is always accessible (the user must be logged on to make a page retrieval request).

Page operations software, in enforcing the database availability protocol, makes use of resource management services for obtaining database directory information from the resource control table. In the directory entry for a database, the online/offline status of that database is kept. Page operations will deny access to an offline database. The database accessibility attributes are also maintained in the directory. Databases are defined as having either public or private access, for both local and remote callers. If defined as private for a certain type caller (local or remote) page operations will call session services routines to check a requesting users access rights to its database (see Session Management below).

Page operations software is also responsible for the initiation of any post page retrieval processing required for a particular page. Some Vidoetex pages may require additional dynamic processing to complete the page retrieved. A given page may require the initiation of a program or transaction to perform some unique updating dating or dynamic creation of pages. Page operations must detect this condition and forward the retrieved page to the Start Transaction Command Handler (see Applications Programs Management below).

Data Management has two other subcomponents: tagged data services and dynamic page creation services. The tagged data services command handler is used for basic data manipulation of nonpage data objects. These data objects have numeric labels, i.e., tags, and are stored in a variety of places. Tagged data may be objects that are sub-structures of existing structures or entire records on disk. For example, certain parts of the user directory may have been identified as a tagged structure, allowing external components to retrieve and/or update certain fields by tag. The users' synonym data, managed by the user interface software in the end-user terminal, is maintained as a record on a disk file. This record is a tagged data object and can be retrieved or updated by external callers using this common interface. External callers range from programs in other address spaces (System Administrator software) to distribution subsystem processors of remote Operations Nodes. Tagged data services, like page operations, are responsible for routing requests to remote nodes, if necessary, and the subsequent response data routing.

The other subcomponent, dynamic page creation services, is used primarily by components that must communicate with the end user in a more dynamic fashion. This routine accepts EBCDIC text as input along with certain control words for defining field attributes and creates a well formed Videotex page complete with the appropriate control data necessary for handling by the distribution subsystem processor and end-user's terminal software. Dynamic page creation services support a wide range of options that permit: (1) designing and tailoring of a full screen of text data; (2) identifying unprotected fields for input processing; (3) controlling post input "type check" processing; (4) providing headings and color information; and (5) a NAPLPS imbed option. This service is used by certain transaction management routines, by user session services software, and miscellaneous panel creation utilities.

Session Management

Overall session management is accomplished in distributed fashion through the cooperation of components that span processors and nodes. At the level of the user interface, session management is largely the responsibility of the software running in the end-user terminal. The distribution subsystem processor also maintains some session management data on behalf of the connected end user. The host must also maintain session data on behalf of end users.

Almost all processing done on the host is as a result of some end-user action. As mentioned earlier, the "work unit" serves as the basic interface between components. It also identifies the end user that is responsible for the generation of a particular piece of work. The user's SAC and ON-ID numbers are contained in the work unit. Components processing in a "user sensitive" mode must have immediate access to this information. If any component requires additional user information, the SAC and ON-ID numbers can be used as input to a call to resource management services (RMS). RMS locates and returns the user's directory entry in the Resource Control Table. The user ID, user type, skill level, and miscellaneous control flags are contained in the directory. RMS also returns a pointer to the user's control block extension area.

Session management routines are responsible for building and maintaining the extended user control areas. These control blocks are built at logon time by a module called user initiator/terminator (UIT) module. During logon processing the user ID and password are validated and the user directory is obtained from a secure dataset and updated in the Resource Control Table using resource management services. UIT then sends a copy of the user's directory data along with his synonym record to the appropriate distribution subsystem.

Command handlers, in cooperation with session management services, help maintain the user's session. Prior to the execution of any command, a preprocessor module is invoked. This module logs the current command executing in the control block extension area. If the current request is destined for another node, the node history table in the extension area is updated appropriately. The preprocessor returns a "preprocessing status code" to the command handler. This code will indicate one of the following: (1) the current command has been cancelled; (2) the previous command has not been completed; or (3) continue normal processing. Command handlers respond accordingly. Just after command execution, before sending the response data to the originating distribution subsystem, the command handler calls a postprocessor module. This module records statistics and returns current command status. Again, the command handler responds accordingly. For example, a completed remote page request may be discarded due to a cancel status.

Other session related functions supported in the example implementation are:
RACF interface for logon and logoff processing;
RACF interface for checking user database access authority;
RACF interface for checking user transaction access authority;
Query for current command status; and
Cancel current command.
During logoff, processing session management is responsible for:
Initiating "implicit logoff" processing at all nodes identified in the node history table;
Terminating all current command execution;
Purging all transient pages created during the user's session;
Recording final session statistics in the SMF database; and
Cleaning up all user session data.

Any changes to the user's directory data will be handled by a separate invocation of the tagged data services module initiated by the distribution subsystem.

Application Programs Management

The processing requirements for supporting application programs are:
multiple user support - concurrent usage;
initiation/termination processing;
access to Videotex Services;
access to Videotex Data;
access to Videotex Network; and
access to Third Party Data.

Transaction Application Subsystem (TAS)

The environment used to support application programs is called the Transaction Application Subsystem or TAS.

This environment supports all three types of application programs detailed under the "Application Programs Services" heading above.

Figure 8:
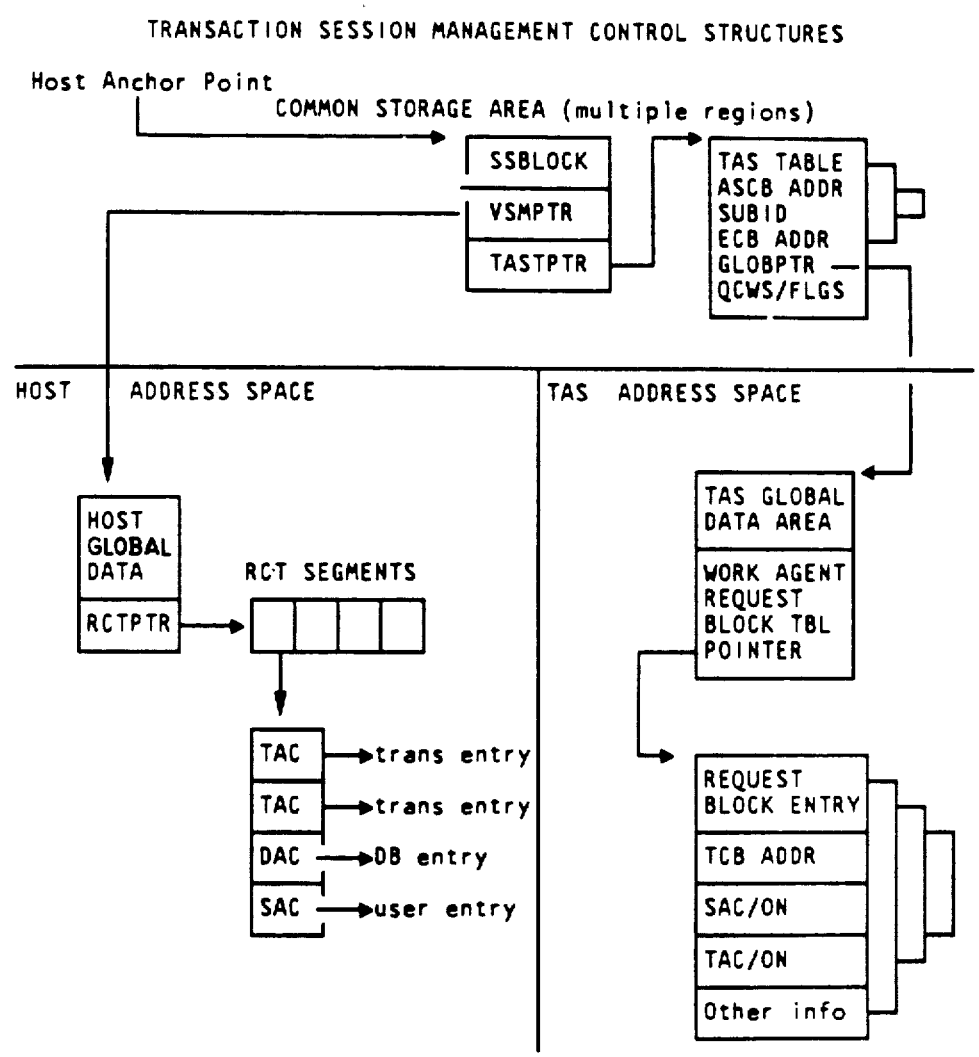
FIG. 8 is an overview of the transaction data area maintained by an ON host

The Transaction Application Subsystem is a Videotex subsystem that resides in its own address space(s) (see FIG. 8). The host control region manages one or more address spaces that constitute the Transaction Application Subsystem. Each such address space is called a TAS region. All TAS regions have identical structure as shown in FIG. 6. Multiple TAS regions may be activated by a systems operator in order to: (a) support load balancing; (b) support controlled testing environments; and (c) provide for application code isolation and security.

In FIG. 6, the "User Code" portion represents an application program that is invoked (a) to add value to an existing VAN page, (b) as a result of a menu choice selected by the end user, or (c) as a result of a "start transaction" request from the distribution subsystem. FIG. 7 illustrates the logic associated with the execution of a sample application program.

TAS Initialization

When the host is initialized at system startup, a "transaction directory" is built in main storage of the host control region. The transaction directory contains an entry for each application program known to the Operations Node. It contains the following information:
Transaction Title;
TAC—Transaction Access Code;
HON—Home Operations Node ID;
PGM—the application program to be executed;
STAT—local and external status bytes;
ONLN—online/offline indicator+flags;
SID—subsystem ID; and
TASI—Index into Global TAS Table.

An application is not available until the TAS region associated with it has been activated and brought online. An Operations Node providing transaction applications makes its resources available according to its schedule of availability. It is for this reason that the TAS regions are not automatically started at initialization time; rather a TAS region started (or brought online) by the operator upon explicit authorization by a Systems Administrator. Once the region is started, the Transaction Subsystem Initiator (TSI) (see FIG. 6) makes itself "known" to the host control region. This is called "subsystem connect" processing. From this point onwards, application programs associated with the TAS region become available for use by the end users.

During subsystem connect processing, TSI provides the control region with all the information required to access application programs associated with the TAS region. This information is used to build an entry in a table called the TAS table that contains the attributes of each of the TAS regions.

The host control program maintains a request queue in the host region for communication between the TAS regions and the host. All start transaction requests are placed on the "TSM" queue where "TSM" is the generic representation of input queues for TAS regions. FIG. 8 shows the data structures required to support TAS address spaces.

How Application Programs are Invoked

Figure 9:
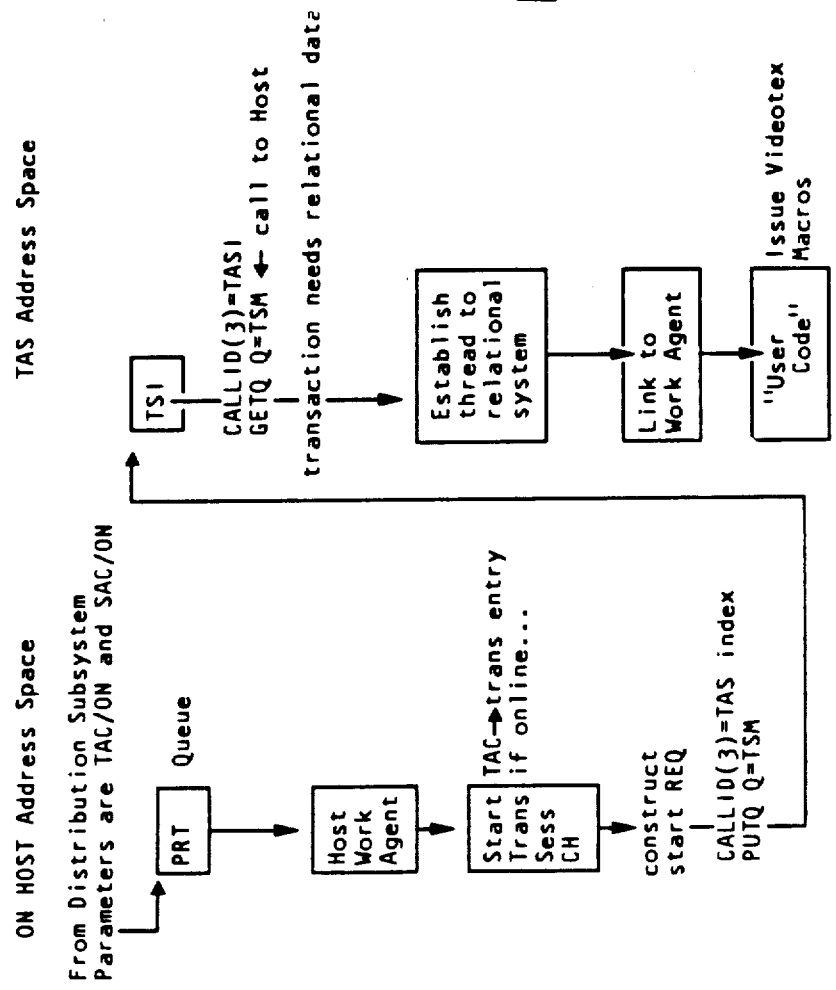
FIG. 9 details the logic involved in starting an application program on the host.

The distribution subsystem requests that a transaction session be started on behalf of a given user by constructing a request block and passing that request to the host (see FIG. 9). The request activates the Start Transaction Session command handler, which interacts with other system services in establishing the transaction session. This command handler is responsible for: forwarding "remote" start requests to target nodes; initiating implicit logons for remote users (if not already logged on); obtaining the transaction directory entry via a call to RMS; initiating "access check" processing, if required; and passing the start request to the appropriate TAS region. The transaction directory entry will indicate whether or not this transaction is currently available, and identify the accessibility status of the transaction. Transactions defined as "private" will require access checks. The transaction directory also contains an index into the TAS table, identifying the owning TAS region.

The Transaction Subsystem Initiator after having completed subsystem connect processing, simply waits for work. When a request is placed on its queue in the host region, the scheduler wakes up TSI using information stored in the TAS table, whereby TSI issues a GETQ request to the host region. Once the queue element has been obtained TSI locates a free Work Agent request block (see FIG. 6) and updates it with the passed information (a composite of the transaction directory entry and some fields from the invoking user's directory entry). Then, based on the environment required by the transaction, it performs the appropriate Work Agent attach processing.

When the Work Agent has been attached, TSI solicits the host for more work. When the request queue has been thus depleted, the initiator waits on multiple events. These are the completion events of one or more active Work Agents and the event caused by a host-to-TAS "work pending" signal. When a Work Agent has completed its work it is detached by TSI.

When a Transaction Work Agent (TWAG) is activated by TSI, it searches the Work Agent request blocks for the one it has been assigned. It then claims the request block and sets up the execution environment. The TWAG also establishes a recovery environment, loads the transaction program (User Code), and transfers control to the transaction. Transaction Interface Routines (TIRs) are invoked by user code as and when needed to perform various display formatting functions, end user communication functions and file access functions (see FIG. 7).

Because TIRs are shared by potentially many application programs which in turn may be invoked by many end users, each TIR must use the Transaction Access Code (TAC) and ON-ID of the application program (available in the request block of the TWAG) as well as the System Access Code (SAC) and ON-ID of the end user in making service calls to the host control region. Examples of such services calls are access checks on host resources, and sending and receiving data from the end user's terminals. TIRs are also responsible for terminating an interactive session with the end user upon request by the application program.

Operations Node Distribution Subsystem Hardware Environment

FIG. 10 presents a sample hardware environment that may be used to implement the distribution subsystem. This sample hardware uses the IBM Series/1 as the processor. Other sample processors that may be used are the DEC PDP 11/70, the Data General Eclipse/1, and equivalents. The number of terminals supportable will vary depending on the exact configuration. The example hardware can support up to 64 end-user terminals.

The hardware components that may be varied to obtain different levels of performance are:
(1) a 4956 processor with built-in 30MB disk and 1MB real storage as the built-in disk provides the most cost-effective configuration;
(2) one diskette drive, any model, necessary to install software and for diagnostics; and
(3) a 4978 or 4980 terminal for an operator, for diagnostic execution, and for miscellaneous use.

Distribution Subsystem Software Environment

The distribution subsystem software architecture has many basic properties fundamental to its organization. These are as follows:

Multitasked: This feature is provided by the underlying system control program. For example, for the sample hardware shown, the preferred control program is the IBM Event Driven Executive. Alternate control programs include the IBM Real Time Programming System (RPS).

Queue driven: Communication among the tasks, particularly with regard to requesting service from one task by another, takes place using queues. Each task has an input request FIFO queue that it checks for work. The queue contains request parameters and the processing normally results in the production of a request on another task's queue. (In the simple case, the request is the response information).

Memory constrained: The architecture reflects the fact that real memory available on the system may limit the capacity and flexibility to support a large population of terminals.

Resident: The programs reside in main storage at all times, except for a few utility programs. There is no dynamic loading or unloading using auxiliary storage.

Interrupt driven I/O: No polling.

Partially re-entrant: Some of the modules are reentrant. Others are serially reusable by virtue of their handling only one request at a time as extracted from their input queues.

Dedicated system: The software acts as if there is no contention for hardware resources from other applications.

Figure 11:
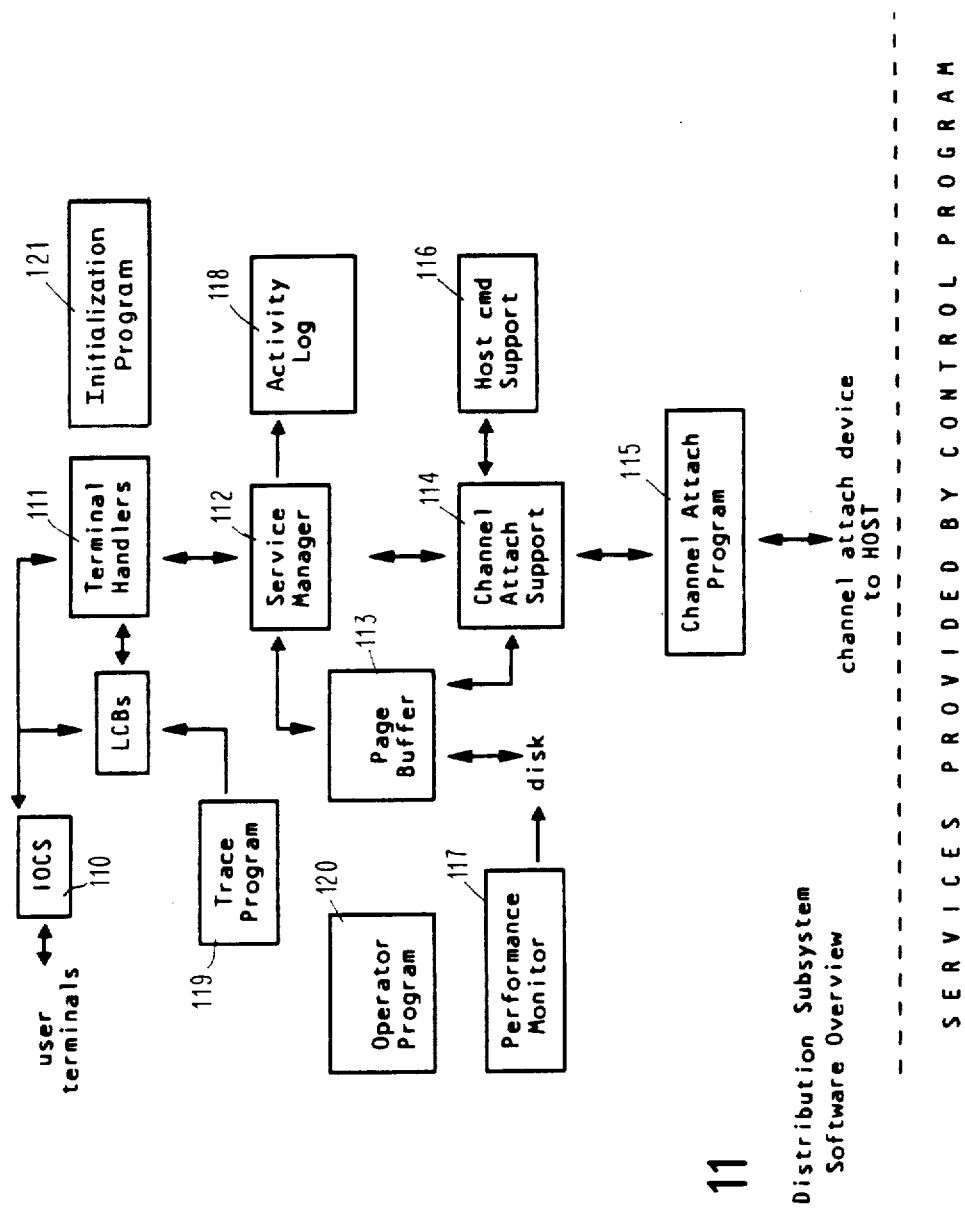
FIG. 11 shows the software involved in executing the logic of the distribution subsystem.

FIG. 11 shows the overall organization of the components that comprise the distribution subsystem software. Functionality spreads across many different programs, all competing for the CPU and other resources at once. There is no "main" program in control. The control program arbitrates among the competitors using its algorithms in most cases, with some lower level control within a specific module done by the module itself. A description of data flow through the modules will be discussed later, but first a brief description of the functional elements pictured in FIG. 11 follows.

The I/O Controller Subsystem (IOCS) 110 provides the "link layer" protocol support for communication with the user terminals over asynchronous local or dial-in lines. This includes interrupt handling, error recovery, writing, reading and device control.

The Terminal Handlers 111 provide the "session layer" protocol for communication with the user terminals. Some communication with the terminal may be handled completely by this layer and below, but most of it involves the Service Manager 112 at the application level. Adequate implementation may be accomplished with only one Terminal Handler.

The Service Manager 112 is effectively the "main program" as user actions eventually percolate up to this, the "application layer." It processes commands from the user, sending requests to the page buffer manager, the channel attach support, the terminal handlers, and so on.

The Host Communication components, Channel Attach Support 114 and Channel Attach Program 115 control the communication channel (22) (see FIG. 2) between the Host (20) and the distribution subsystem (21). Other components interact with them through a set of macros and data buffers.

The Host Command Support component 116 routes Host commands. Most interaction with the Host is the result of user action. However, the Host initiates some functions supported by the distribution subsystem. Any command generated by the Host (as opposed to responses for commands from the distribution subsystem) is routed through this task for processing.

The Page Buffer Manager 113 maintains a collection of videotex pages on local disk for quick retrieval without involving the Host. Requests to retrieve a page go through here first to see if the page has been saved. Pages sent from the Host are written to the disk by this component.

The Performance Monitor 117 is task that periodically executes and samples system performance statistics, writing the snapshot buffers to disk for later analysis.

The Activity Log 118 is a task that controls the log of activity within the Service Manager, periodically writing it to disk for later analysis.

The Trace Program 119 is an optional program that interacts with the IOCS through LCBs to control tracing on the terminal lines and record the results.

The Operator Program 120 is a program that runs from a locally attached terminal that provides control over ON parameters and operation. It also includes display functions to monitor system operation. This program is not required for the ON to run.

The Initialization Program 121 initializes the subsystem software by allocating storage, loading programs, starting up the I/O devices and so on, before exiting. It does not exist during normal operation.

Sample System Flow

Given the overview in FIG. 11, the following is an example of how control and data flow through the system for a sample operation. Let the request be a page retrieval as initiated by the user. Assume the page does not exist in the page buffer 113.

```
command data from terminal→
Interrupt handler→
terminal IOCS (110)→terminal handler (111)→
service manager (112)→→page buffer (113)→
channel attach (114,115) output task→I/O to Host
Host writes response→
channel attach (114,115) input task→
page buffer (113)→service manager (112)→
terminal handler (111)→
IOCS (110)→write data to terminal
```

Acknowledgements and error recovery are not shown, and neither are peripheral functions such as the performance monitor and the channel attach timer task.

In further detail, the operating steps are as follows.

1. The interrupt handler gets on byte at a time from the terminal line and passes them on to the IOCS 110. The IOCS assembles them into a line-level packet and removes the packetizing data, producing a data stream for higher level processing.
2. When the IOCS 110 has sufficient data, it generates a queue element and sends it to the terminal handler (111) associated with that terminal.
3. The terminal handler 111 checks for session layer information and routes the data on to the service manager (112) user task for this line.
4. The service manager 112 decodes the request and does the processing that it can. Eventually a page retrieval command is built for sending to the Host. But first, the request goes to the page buffer manager 113.
5. The manager 113 determines that the relevant page is not in the buffer and routes the request on to the channel attach (114,115) output task.
6. The output task writes the request to the Host.
7. The Host response comes back through the input task. The task takes the queue element on the pending response list and fills it in with pointers to the input data. Since the task can recognize a page retrieval response, it routes the response to the page buffer manager 113 instead of the service manager 112.
8. The page buffer manager 113 inserts the page into the buffer and then sends the data to the service manager 112. Note that the page buffer manager 113 is *not* operating in parallel with the service manager processing of the same data. The page goes into the buffer (113) *before* it even gets to the service manager 11. The main reasons for the serial processing here are: (a) the time spent by the page buffer 113 is not substantial compared to all the other components in the path, and (b) since the page buffer manager 113 and service manager 112 would share the same physical data, added complexity would be required to make sure the service manager 112 did not release the storage before the page buffer 113 finished. This serialization can clearly be removed if necessary.
9. The service manager 112 packages the data for shipment to the terminal, using the application protocols. It sends the data in the buffer (113) to the terminal handler 111.
10. The final stages packetize and write the data, and process the acknowledgment. The tricky part here involves writing part of the page and getting acknowledgments along the way. The distribution subsystem does not normally have enough memory to make sure that all the lines can keep a page in logical storage at once. Thus, swapping in of one segment at a time per line during its write to the terminal is done with acknowledgement after reach segment (multiple packets). The intermediate stages are required only if a transfer exceeds one storage segment.

Operations Node End-User Terminal Hardware Environment

An example of a hardware configuration for the end-user interface is shown in FIG. 12. The components are generally as follows.

A computer, such as a PC, with a least 256KB of memory is required.

A computer keyboard for inputting commands and data is required.

A Diskette with drive is required but a Hard Disk is optional. Some services may require write access to file.

A color monitor is required for a Videotex environment. A monochrome monitor may be used to support a non-videotex environment.

Required additional hardware are a graphics adapter and a modem if the system is not locally attached.

End User Terminal Software Environment

Figure 13:
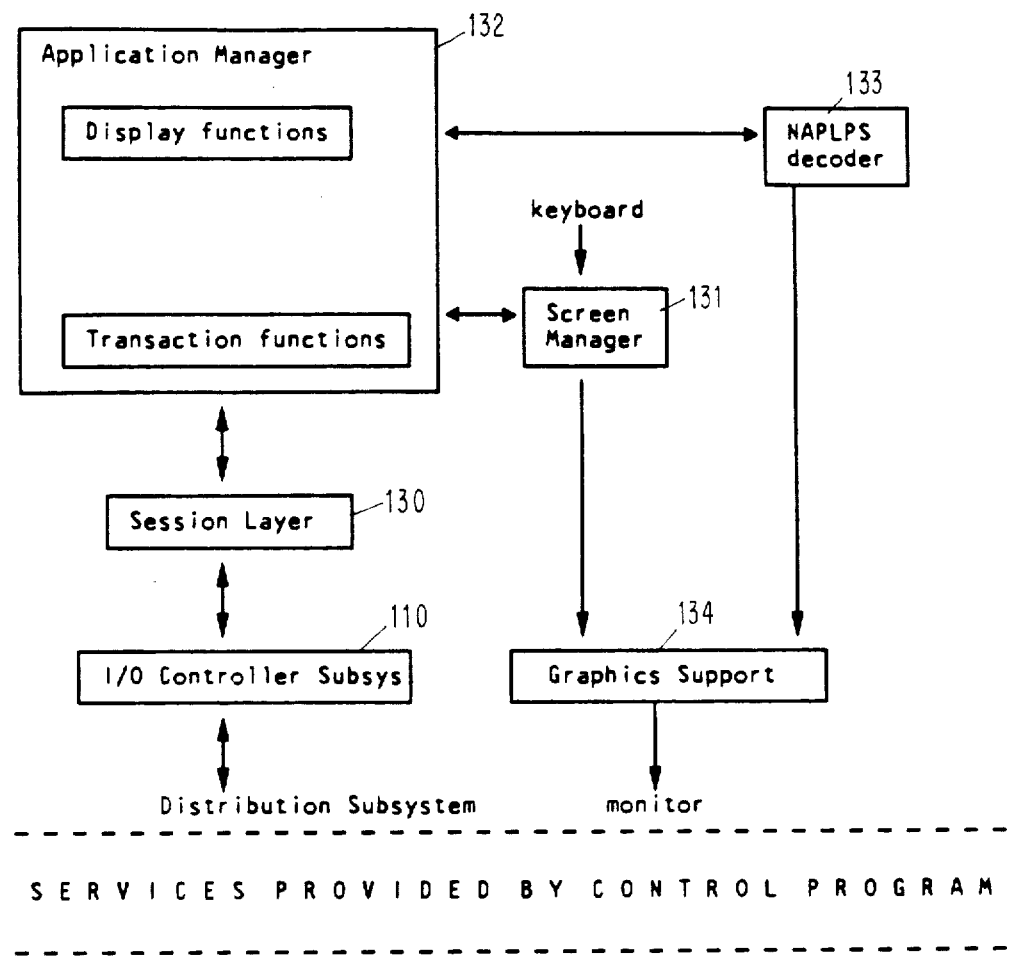
FIG. 13 shows the software involved in executing the logic of the end user terminal.

The major components of the PC terminal software will now be described with general reference to FIG. 13.

Firstly, Supervisor and Shared Services interface routines are provided for access to the operating system services for intertask communication, memory management, and timer control (they are not indicated in the Figure). The I/O Controller Subsystem 110 provides the link layer communication to the processor (Series/1). The IOCS 110 implements the packet transfer mechanism over asynchronous data lines, with error recovery. It consists of two tasks, one for data writes and control operations, and the other for processing input data from the communications line. The IOCS deals with the session layer above it.

The Session Layer 130 provides the session layer protocol, primarily for session initiation and termination and for being the pipe between the application and data link layers. It is a single task that listens for requests and data signals from its two neighboring layers.

The Screen Manager 131 is a task to manage the screen and the keyboard. It maps keystrokes into their definitions and controls such functions as cursor control and echo. In addition, the task manages windows for user input and program output.

The Application Manager 132 is the main port of the Videotex subsystem. This task communicates with the session layer 130, the screen manager 131, and the NAPLPS decoder 133 in processing user requests from the keyboard and data sent from the processor (Series/1). Many of the Videotex functions for database navigation and data retrieval are handled completely by the application manager 132, such as scrolling, selecting menu choices, recalling previously seen information, and synonyms. Most functions eventually result in a Videotex page retrieval being initiated through the session layer 130. Thus a typical scenario is as follows: (a) the user enters a command via the keyboard; (b) the screen manager 131 sends a signal to the application manager 132 that a command has been entered; (c) the application manager 132 decodes the command and figures out what page or other data is required from the Host; (d) the application manager 132 formats and sends a command to the Host via the session (130) and lower layers; (e) the Host response returns via session layer 130 and is processed by the application manager 132.

An additional application manager function is to manage transaction input by defining input fields/windows through the screen manager 131 and processing the user input data. Customizers may be used, that is, standalone programs that the user may run to customize his keyboard definition and to customize application parameters such as the amount of memory to allocate for stacks (they are not indicated in the Figure). The NAPLPS decoder 133 converts a NAPLPS data stream into the graphic commands.

Graphic Support 134 software converts primitives into actual images on the monitor.

The two remaining figures, FIGS. 14 and 15, show the end-user terminal architecture in further detail. Firstly, the I/O Receiver task 140 receives input data and signals whenever output data has completed. It packages input data for shipment to Session Layer tasks 130 and ultimately to the application. The Session Layer asks the I/O Service Manager task 112a to write data to the communications line. The Interrupt Handler 141 processes the lowest level signals from the communications line hardware, and the Timers 142 limit the amount of time to wait for certain events before initiating error recovery.

An example of the operation of the keyboard processing architecture shown in FIG. 15 is as follows. The user input signals arrive via the Interrupt Handler 141a and the control program. The Screen Manager 131 uses a definitions table 150 to interpret keystrokes and control their processing once an entire command is received. A Window Manager 151 interacts with the lower level graphics support on the monitor. The individual command handlers 152 are activated based on the specific command 153 and they manipulate user data 154 and message 155, communicating with the Host via the IOCS 110 as needed. The process is repeated with the next user input.

It will accordingly be seen that an architecture for and the implementation of an information utility has been described for accessing information and executing transactions on an interactive basis between Videotex databases and individual end user terminals in a novel and advantageous form and manner.

Having thus described our invention, what we claim as new and desire to secure by Letters Patent is:

1. A system for enabling users thereof to electronically access a wide range of information, and including a capability for interuser messaging and executing of transactions, comprising:
 a. terminal means for displaying graphical and textual information to a user;
 b. a first operational node connected to said terminal means and comprising:
  (1) first database means comprising page means for providing graphical and textual information, said page means comprising a plurality of pages, each page comprising a variable length electronic data structure comprising control information and displayable data, said control information comprising at least one exit path for directing the user from one page to another page; and
  (2) first application program means for exchanging messages and executing transactions on behalf of said user; and
 c. a second operational node comprising second database means and second application program means for respectively providing graphical and textual information, and exchanging messages and executing transaction on behalf of said user; and
 d. means for enabling said terminal means to access said graphical and textual information from said first and second database means and to exchange messages and execute transactions with said second operational node, through said first node means.

2. A system as in claim 1 further comprising a third operational node connected to said first operational node and comprising third database means and third application program means for providing information about said first and second database means and said first and second application program means to said terminal means.

3. A system as in claim 1 wherein said enabling means comprises network means for operationally connecting said first and second operational nodes.

4. A system as in claim 3 further comprising third database means for supplying graphical and textual information and operational node means for connecting said third database means to said network means for accessing by said first and second operational nodes.

5. A system as in claim 3 further comprising a plurality of terminal means for displaying graphical and textual information and operational node means for connecting said plurality of terminal means to said network means.

6. A system as in claim 3 characterized in that the first and second operational nodes each comprise directory database means for providing a directory of available graphical and textual information on said network means and operational nodes.

7. A system as in claim 3 wherein said first operational node further comprises means for connecting another terminal means and another database means to said network means.

8. A system as in claim 3 further comprising operational node means for operationally connecting said network means to a database outside of said network means.

9. A system as in claim 3 further comprising operational node means for operationally connecting said network means to another network means.

10. A system as in claim 3 further comprising operational node means, comprising a plurality of application programs and connected to said network means, for exchanging messages with and executing transactions with said terminal means through said first operational node.

11. A system as in claim 3 wherein said first operational node further comprises means for identifying said user, said identifying means comprising a combination of an operational-node-unique identifier and a system access code, the combination of which is unique to said network means.

12. A system as in claim 3 wherein said first database means comprises means for identifying said first database, said identifying means comprising a combination of an operational-node -unique identifier and a database access code, the combination of which is unique to said network means.

13. A system as in claim 1 wherein said first database means comprises a database directory of said first operational node.

14. A system as in claim 1 wherein said first database means further comprises pageset means for organizing said page means in a scroll sequence.

15. A system as in claim 14 further comprising scroll means for accessing said page means in their sequence order within a pageset means for display on said terminal means.

16. A system as in claim 1 further comprising find means for accessing said page means directly from within said database means.

17. A system as in claim 1 further comprising mark means for marking said page means being displayed on said terminal means for later access.

18. A system as in claim 1 further comprising recall means for recalling said page means that was marked for later access.

19. A system as in claim 1 further comprising defining means for identifying said page means being displayed by a synonym for later access.

20. A system as in claim 1 wherein said first application program means comprises means for adding information to said page means after being selected for and prior to display.

21. A system as in claim 1 further comprising first check means for accessing said first database means and second check means for accessing said page means.

22. A system as in claim 1 wherein said first application program means comprises means for invoking and executing a program in response to a user selection through said terminal means.

23. A system as in claim 1 wherein said first application program means comprises means for exchanging information between said terminal means and an operational node.

24. A system as in claim 1 wherein said first operational node comprises host means for accessing data and distribution subsystem means for caching said data.

25. A system as in claim 24 wherein said host means comprises a receive port and a transmit port and further comprising means for handling all communications to said receive port from said distribution system means and means for handling all communications from said transmit port to said distribution system means.

26. A method for establishing a system for electronically accessing information, exchanging messages, and executing transactions through an end user terminal at an operational node, comprising the steps of:
    a. providing a first database comprising a plurality of pages of graphical and textual information in the form of variable length electronic data structures, each page comprising control information and displayable data, said control information comprising at least one exit path for directing the user from one page to another page;
    b. providing said terminal with a display for graphical and textual information;
    c. constructing a first operational node connected to and including said first database and said terminal;
    d. providing a second database for supplying graphical and textual information;
    e. constructing a second operational node including said second database and connected to said first operational node for supplying graphical and textual information to said terminal through said first operational node; and
    f. providing a first application program at said first operational node and a second application program at said second operational node for controlling transferring of information, exchanging of messages and executing of transactions between said terminal and said second operational node through said first operational node.

27. A method as in claim 26 further comprising the step of connecting a third operational node to said first operational node including a third database and a third application program for providing information about said first and second databases and said first and second application programs to said terminal.

28. A method as in claim 26 comprising the further step of operationally connecting said first and second operational nodes to a network of operational nodes.

29. A method as in claim 30 comprising the further step of providing a third database for supplying graphical and textual information and an operational node for connecting said third database to said network for accessing by said first and second operational nodes.

30. A method as in claim 28 comprising the further step of providing a plurality of terminals for displaying graphical and textual information and an operational node for connecting said plurality of terminals to said network.

31. A method as in claim 28 comprising the further step of providing each of the first and second operational nodes with a directory database of available graphical and textual information on said network and operational nodes.

32. A method as in claim 28 comprising the further step of connecting another terminal and another database to said network.

33. A method as in claim 28 comprising the further step of operationally connecting said network to a database outside of said network.

34. A method as in claim 28 comprising the further step of operationally connecting said network to another network.

35. A method as in claim 28 comprising the further step of providing an operational node comprising a plurality of application programs and connecting it to said network for exchanging messages with and executing transactions with said terminal through said first operational node.

36. A method as in claim 28 comprising the further step of providing said first operational node with means for identifying said user comprising a combination of an operational-node-unique identifier and a system access code, the combination of which is unique to said network.

37. A method as in claim 28 comprising the further step of providing said first database with means for identifying said first database comprising a combination of an operational-node -unique identifier and a database access code, the combination of which is unique to said network.

38. A method as in claim 28 comprising the further step of providing a database directory of said first operational node.

39. A method as in claim 26 comprising the said first database means further step of organizing said pages into a pageset in a scroll sequence.

40. A method as in claim 26 further comprising the step of accessing said pages in their sequence order within a pageset for display on said terminal.

41. A method as in claim 26 further comprising the step of accessing a page directly from within said first and second databases.

42. A method as in claim 26 further comprising the step of marking said page being displayed on a terminal for later access.

43. A method as in claim 26 further comprising the step of recalling a page that was marked for later access.

44. A method as in claim 26 further comprising the step of identifying a page being displayed by a synonym for later access.

45. A method as in claim 26 comprising the further step of adding information to a page after being selected for and prior to display.

46. A method as in claim 26 further comprising the steps of access checking said first database and access checking a page.

47. A method as in claim 26 comprising the further step of invoking and executing a program in response to a user selection through said terminal.

48. A method as in claim 26 comprising the further step of exchanging information between said terminal and an operational node using said first application program.

49. A method as in claim 28 comprising the further step of providing said first operational node with a host for accessing data and a distribution system for caching said data.

50. A method as in claim 49 comprising the further steps of providing said host with a receive port and a transmit port and handling all communication to said receive port from said distribution system and handling all communications from said transmit port to said distribution system

* * * * *